United States Patent Office 2,779,706
Patented Jan. 29, 1957

2,779,706

INSULIN EXTRACTION

Jan Daniël Herman Homan, Oss, Netherlands, assignor to Organon, Inc., Orange, N. J., a corporation of New Jersey No Drawing. Application August 1, 1951,
Serial No. 239,850

Claims priority, application Netherlands August 12, 1950

6 Claims. (Cl. 167—75)

The first treatment to which ground pancreas glands usually are subjected in the manufacture of insulin preparations, consists of repeated extraction with a suitable solvent. As extraction solvent, first water was used with which the extraction can take place in acid as well as in alkaline medium. Later the preferred extraction medium used was an alcoholic medium. Such an extraction can be carried out in neutral and acid as well as in alkaline medium. At present, extraction generally is effected by means of acidic alcohol in order to reduce to a minimum the destructive action of proteolytic enzymes on insulin. (See A. Grevenstuk and E. Laqueur, Insulin 1925, page 208; see also Ch. Bomskov, Methodik der Hormonforschung, 1937, vol. 1, page 660.)

According to C. M. Jephcott, Trans. Roy. Soc. Canada V, Biol. Sci. vol. 25, page 183 (1931) (see also D. Hill and F. Howit, Insulin 1936, page 32, and Ch. Bomskov, Methodik der Hormonforschung, 1937, vol. 1, page 671) extraction carried out in the presence of hydrochloric acid gives the best yield when the alcohol concentration in the extraction mixture amounts to approximately 60 to 80% by volume. Therefore, it is not surprising that all the known extraction methods in which acidified alcohol is applied, yield an extract of an alcohol content of approximately 60 to 80% by volume. For instance, C. H. Best and D. A. Scott, J. Biol. Chem. vol. 57, page 709 (1923); Lilly & Co.; J. A. Med. Assn. vol. I, page 1851 (1923); H. Peneau, J. Pharm. Chim. vol. 30, page 145 (1924), describe an alcohol concentration of the extract of approximately 60% while M. R. Blatherwick et al., J. Biol. Chem. vol. 72, page 57 (1927) and British Patent No. 566,351 mention an alcohol concentration of 63–65%.

Surprisingly it has been found that repeated extraction by means of an about 45–55% (by volume) alcohol solution in the presence of a salt having a monovalent anion in a quantity of not more than a few percent by weight, said salt not being a salt of a heavy metal, gives a much higher insulin yield than the usual extraction method with 60–80% (by volume) alcohol.

An increase in yield of approximately 10–20% is achieved when proceeding according to the present invention. The alcohol concentration, of course, is calculated for the total quantity of liquid present in the extraction mixture, thus including the water present in the glands.

It is evident that this extraction method is a very specific method for recovering insulin from glands. The resulting extracts contain much lower amounts of dissolved troublesome ballast materials than extracts obtained heretofore. Said ballast materials consist of substances having a reducing effect, said materials being capable of destroying insulin present in said extract to a considerable extent. The extracts also contain lower amounts of fatty and protein-like disturbing substances than extracts with a higher alcohol content. Because the alcohol content is lower in extracts prepared according to the present invention, the removal of alcohol from the extract during subsequent steps of purification gives rise to considerably less trouble than its removal from extracts obtained according to known methods.

In order to eliminate the danger that, due to varying liquid content of different kinds of pancreas glands, extraction takes place outside the above indicated alcohol concentrations, it is recommended to determine the water content of each batch of gland before extraction.

When using according to the present invention salts with a monovalent anion, heavy metal salts are excluded since they precipitate on further purification of the resulting extracts in the form of their hydroxides at a pH between 4.0 and 5.5. Such precipitated heavy metal hydroxides not only render filtration quite difficult but they also cause adsorption of insulin to the precipitate thereby even causing complete precipitation of the insulin with the heavy metal hydroxide.

The improvement in yield is achieved not only by the use of an alcohol concentration of 45–55% by volume, but also by adding the above mentioned metal salts to the extraction solvent. Said salts have the further advantage that they facilitate subsequent treatment of the extracts. In contrast to metal salts having a monovalent anion, certain electrolytes which do not contain heavy metals namely those with polyvalent anions, such as the sulfates, the phosphates of such non-heavy metals, often cause very strong adsorption of insulin to all kinds of dispersed substances present in acid, alcohol containing pancreas extracts. This phenomenon might be connected with a known type of adsorption as described by A. Tiselius, Arkiv. f. Kemi, Mineralog. och Geol. vol. 26 B (1), page 1 (1948); see also Chem. Abstr. vol. 43, page 1624 (1949). This adsorption effect is also observed in known extraction methods with an alcoholic medium when using sulfuric acid as acidifying agent, for instance, when proceeding according to the method of Blatherwick et al. or when using phosphoric acid for acidifying (see, for instance, H. Langecker and W. Wiechowski, Klin. Wochenschr. vol. IV, page 1939 (1925), and Swiss Patent No. 264,296, page 3, line 20. When proceeding according to these methods a lower extraction yield is found than when using hydrochloric acid as acidifying agent for extraction.

The increase in yield obtained according to the present invention is, at the same time, accompanied by an increased precipitation of the fine, dispersed reducing substances which, thus, after extraction are substantially removed together with the gland residues by simple centrifugal action. For this purpose no special high efficiency centrifuges are required. The ordinary laboratory and plant centrifuges are perfectly suitable.

The salt is added to the extraction solvent preferably in a quantity of not more than a few percent by weight. Examples of such salts are sodium chloride which is added, for instance, in an amount of 0.25% by weight, potassium chloride (0.4% by weight), potassium bromide (0.6% by weight), ammonium chloride (0.3% by weight), calcium chloride (0.25% by weight), tetramethyl ammonium chloride (0.6% per weight), and the sodium salt of p-toluene sulfonic acid (0.5% by weight). The preferred salt is ammonium chloride.

It has been found that the extraction process according to the present invention can be carried out particularly effectively and easily if the quantity of extraction solvent added to the gland amounts to at least twice the quantity by weight of such glands.

Furthermore it has been found that extraction and subsequent separation of the gland residues can be carried out most advantageously at temperatures between about 5° C. and about 15° C. because at such temperatures only small amounts of ballast substances are retained by the extract without any decrease in the extraction yield.

The resulting extracts which, as stated above, contain relatively small amounts of fine, dispersed substances which might have a disturbing effect on subsequent purification, are combined and are adjusted to a pH value between about 4.0 and about 5.5. Thereby, the reducing substances, together with other disturbing material, precipitate completely and very easily and can rapidly and readily be filtered off. Under these circumstances the danger that insulin be adsorbed to the precipitate as well as the possibility that the insulin be reduced, is very small so that the loss of insulin is insignificant. Any insulin present in the precipitate can readily be removed therefrom by washing.

Vacuum distillation for the removal of most of the alcohol which distillation, heretofore, had to be carried out before purification at a pH of 4.0–5.5 (see, for instance, British Patent No. 566,351), and which always involved a considerable loss of insulin, is superfluous in the process according to the present invention due to the favorable alcohol concentration of the extract.

After filtering off the precipitate, the filtrate is adjusted to a pH-value between about 7.0 and about 8.5 to precipitate other disturbing by-products. Although at such a pH-value the conditions for a reduction of insulin by reducing by-products are favorable, no loss of insulin worth mentioning occurs, because all such reducing substances have been removed. The precipitate obtained at such a pH-value of 7.0–8.5 is removed by filtration.

Subsequently the filtrate is acidified and the alcohol is distilled off in a vacuum. The clear filtrate is then salted out, the salt cake containing all the active substances, is separated and dissolved in acidified water. If required, salting out is repeated. The solution of the salt cake in acidified water is finally adjusted to the iso-electric point of insulin, i. e. to a pH-value between 5.0 and 5.5 at which value the active substance precipitates from the solution.

It was found that, when proceeding according to the present invention, in contrast to the usual methods of manufacture, not all of the active substance precipitates at the pH-value mentioned above but that a considerable part thereof remains dissolved in the mother liquor resulting from the normal iso-electric precipitation step. This active substance can be precipitated by adjusting the pH to a value between 6.0 and 8.0. The substance obtained in this manner can, if desired, be purified by solution in acidified water, followed by repeated precipitation at a pH-value between 6.0 and 8.0. This product, the activity of which amounts to about 5 to 10 IU per mg., is obtained in a quantity corresponding to the quality of the pancreas glands used.

Due to the property of the resulting so-called natural insulin of being insoluble at the pH-range of human tissue and blood, it exerts a prolonged action. In this manner a completely natural insulin preparation with prolonged action can be manufactured without requiring addition of any kind of foreign substances.

The natural insulin is already described in U. S. Patent No. 2,449,076. By the known process described therein which extraction and further purification differs from the process according to the present invention with respect to the extraction and further purification steps, there is also obtained natural insulin in addition to normal insulin.

The total yield of natural and normal insulin obtained by following the process according to the present invention is about 100% higher than that obtained when proceeding according to conventional methods, such as according to R. G. Romans, D. A. Scott, and A. M. Fisher, Ind. Eng. Chem. vol. 32, page 908 (1940).

The following examples serve to more amply illustrate the present invention without, however, limiting the same thereto.

*Example 1*

50 kg. of frozen cattle pancreas glands with a moisture content of 70% are ground and added, while stirring, into 140 liters of 61% (by volume) alcohol in which 0.35 kg. of sodium chloride have been dissolved and to which so much hydrochloric acid has been added as is necessary to bring the pancreas dispersion to a pH value of about 3.0 (1.1 liter of concentrated hydrochloric acid). Stirring is continued for 2 hours, while the temperature of the extraction mixture is maintained at 10° C. Thereafter the mixture is centrifuged by means of a bowl centrifuge and is separated into extract and gland residue thereby keeping the temperature also at 10° C. The gland residue is extracted for a second time with 130 liters of 49% (by volume) alcohol, containing 0.32 kg. of sodium chloride. The pH-value the temperature, and the duration of this second extraction step are the same as that of the first extraction step. Again the mixture is centrifuged by means of a drum centrifuge, whereupon the resulting extract is combined with that of the first extraction step. The combined extracts thereupon are adjusted to a pH-value of 4.9, and the precipitate obtained thereby is then removed by means of a filter press. The insulin present is removed from the precipitate by washing with 49% (by volume) alcohol. The clear liquid thus obtained is subsequently adjusted to a pH-value of 7.6 and is again filtered through a filter press. The filtrate is acidified to a pH-value of 3.0 and is then distilled in a vacuum, until the alcohol has been removed. The alcohol-free liquid is freed from dispersed material by filtration. Sodium chloride is dissolved in the resulting filtrate in an amount of 28% by weight. Thereby a salt cake is obtained which after separation from the mother liquor is dissolved in 5 liters of 0.01 N hydrochloric acid. Salting out is repeated with the resulting solution by the addition of 16% by weight of sodium chloride. The second salt cake is dissolved in 2 liters of 0.01 N hydrochloric acid. The resulting solution is adjusted to a pH of 5.0–5.4. Thereby the normal isoelectric precipitate is formed which is converted into crystalline insulin. The mother liquors from the iso-electric precipitate are adjusted to a pH-value of 6.8–7.0, again yielding a precipitate of an active substance representing natural insulin. Said insulin is dissolved and again precipitated. It has, in dry state, an activity of 8 IU per mg. Calculated per kg. of pancreas glands used, 800 IU of this product are obtained in addition to 2800 IU of normal insulin.

*Example 2*

500 kg. of frozen cattle pancreas glands having a moisture content of 75% are ground and, while stirring, are added to 1300 liters of 65% (by volume) alcohol containing 4 kg. of ammonium chloride and 10 liters of concentrated hydrochloric acid to ensure a pH-value of about 3.0. The temperature during extraction is maintained at 12° C. After 2 hours, the mixture is centrifuged by means of a bowl centrifuge at 12° C., whereupon the second extraction is carried out with the gland residues. For said purpose 1200 liters of 51% (by volume) alcohol having dissolved therein 3.5 kg. of ammonium chloride are used. Duration, degree of acidity, and temperature are the same as those of the first extraction step. After centrifuging, the second extract is combined with the first extract. The resulting liquid is adjusted to a pH-value of 5.2, whereupon the precipitate is removed by means of a filter press. Insulin adhering to the precipitate is recovered by washing with 51% (by volume) alcohol.

The clear filtrate is then adjusted to a pH-value of 8.2 and the precipitate formed thereby is filtered off by means of a filter press. The filtrate is acidified to a pH-value of 3.0, whereupon the alcohol is distilled off in a vacuum. The further treatment corresponds to that of Example 1.

From the mother liquors of the normal iso-electric precipitate natural insulin can be precipitated by adjusting their pH-value to 7.4–7.6. The resulting dried product has an activity of 6 IU per mg. It is obtained in a yield of 200 IU per kg. of pancreas glands. Normal crystalline insulin is obtained in a yield of 3500 IU per kg. of pancreas glands.

*Example 3*

50 kg. of frozen newly-born calf pancreas glands are ground. Said glands which contain 77% of water are added to 125 liters of 68% (by volume) alcohol containing 0.35 kg. of calcium chloride and sufficient hydrochloric acid to ensure, during extraction, a pH-value of about 3.0 (about 1 liter of concentrated hydrochloric acid). Extraction takes places at 8° C. for about 2 hours. The extraction mixture is also centrifuged at 8° C. by means of a bowl centrifuge. The remaining gland residues are extracted once more with 110 liters of 53% (by volume) alcohol in which 0.3 kg. of calcium chloride are dissolved. Temperature, pH-value, and duration of said second extraction step correspond to that used in the first extraction step. After centrifuging at 8° C., the gland residues are again extracted in the same way as in the second extraction step, and the resulting mixture is centrifuged.

The combined extracts are adjusted to a pH of 5.0. The resulting precipitate is filtered off as described in Examples 1 and 2 and is washed with 53% (by volume) alcohol. The clear filtrate is adjusted to a pH of 7.8 and the resulting precipitate is again filtered off. The filtrate is acidified to a pH of 3.0 and distilled in a vacuum until the alcohol has been completely removed. Thereafter, the insulin-containing liquid is freed from dispersed material by filtration.

The salt cake obtained by dissolving sodium chloride in an amount of 28% by weight in the clear filtrate, is dissolved in 15 liters of 0.01 N hydrochloric acid. The resulting solution as again salted out by the addition of 16% by weight of sodium chloride. The resulting salt cake is dissolved in 6 liters of 0.01 N hydrochloric acid. Thereafter the pH-value of the solution is adjusted to a pH of 5.2–5.4. The resulting normal iso-electric precipitate of insulin is converted into crystalline insulin. The mother liquors from the iso-electric precipitate are adjusted to a pH of 7.6–7.8. Thereby natural insulin precipitates. After purification, it yields a natural insulin preparation of 10 IU per mg. Calculated for each kg. of pancreas glands, normal crystalline insulin is obtained in a yield of 10.400 IU, whereas the yield of purified natural insulin is 1.200 IU per kg. of glands.

What I claim is:

1. In a process of preparing insulin from insulin containing organs, the step comprising repeatedly extracting said organs by means of an acidic aqueous alcoholic solution of a concentration to yield an alcoholic extract of an alcohol content of about 45–55% by volume, said alcoholic solution containing dissolved therein about 0.3% of ammonium chloride.

2. In a process of preparing insulin from insulin containing organs, the steps comprising repeatedly extracting said organs each time with twice the weight of said organs of an acidic aqueous alcoholic solution of a concentration to yield an alcoholic extract of an alcohol content of about 44–55% by volume, said alcoholic solution containing dissolved therein about 0.3% of ammonium chloride, said extraction and subsequent separation of unextracted organ matter from the extracts being carried out at a temperature of between about 5° C. and about 15° C.

3. In a process of extracting insulin from insulin-containing organs, the step comprising repeatedly extracting said organs by means of an acidic aqueous alcoholic solution of a concentration to yield an alcoholic extract of about 45–55% by volume, said alcoholic solution containing dissolved therein about 0.25% of sodium chloride.

4. In a proces of producing insulin from insulin-containing organs, the step comprising repeatedly extracting such organs by means of an acidic aqueous alcoholic solution of a concentration yielding an alcoholic extract of an alcohol content of about 45–55% by volume, said alcoholic solution containing dissolved therein a small percentage of a salt selected from the group consisting of sodium chloride and ammonium chloride.

5. The process according to claim 4, wherein the organs are extracted with at least twice their weight of said acidic aqueous alcoholic solution.

6. The process according to claim 4, wherein the extraction and subsequent separation of residual extracted organ material from the extracts is carried out at a temperature between about 5° C. and about 15° C.

References Cited in the file of this patent

UNITED STATES PATENTS

| | | |
|---|---|---|
| 2,174,862 | Sahyun | Oct. 3, 1939 |
| 2,449,076 | Lautenschlager | Sept. 14, 1948 |
| 2,529,152 | Grant | Nov. 7, 1950 |
| 2,573,099 | Fredericksen | Oct. 30, 1953 |
| 2,663,666 | Homan | Dec. 22, 1953 |

FOREIGN PATENTS

| | | |
|---|---|---|
| 566,351 | Great Britain | Dec. 27, 1944 |

OTHER REFERENCES

Organon Lab., Biochim et Biophys., acta 76–9 (1948), Chem. Abst., vol. 42, 6061–6062 (1948).

Jensen: Insulin, Its Chemistry and Physiology (1938), pp. 27–30.

Tiselius: "Nature," pg. 79, vol. 170, 1952.

Tiselius: Chem. Abstract, vol. 43, pg. 1624, 1949. (Copy in P. O. S. I.)

Gerlough et al.: J. Pharm. and Exp. Therapeutic, May 1932, pp. 19–30, vol. 45, No. 1.